United States Patent
Munson et al.

(10) Patent No.: US 8,271,683 B2
(45) Date of Patent: Sep. 18, 2012

(54) CONTENT PUSH SERVICE

(75) Inventors: Jonathan P. Munson, Putnam Valley, NY (US); Young Ju Tak, Seoul (KR)

(73) Assignees: International Business Machines Corporation, Armonk, NY (US); Institute for Information Technology Advancement, Daejeon (KR)

( * ) Notice: Subject to any disclaimer, the term of this patent is extended or adjusted under 35 U.S.C. 154(b) by 514 days.

(21) Appl. No.: 12/052,843

(22) Filed: Mar. 21, 2008

(65) Prior Publication Data
US 2009/0240807 A1 Sep. 24, 2009

(51) Int. Cl.
 G06F 15/16 (2006.01)
 G06F 15/173 (2006.01)
 G06F 15/177 (2006.01)
(52) U.S. Cl. ........................ 709/240; 709/238
(58) Field of Classification Search .................. 709/240, 709/238
 See application file for complete search history.

(56) References Cited

U.S. PATENT DOCUMENTS

| | | | |
|---|---|---|---|
| 5,673,381 A * | 9/1997 | Huai et al. .................. | 714/1 |
| 6,757,283 B1 | 6/2004 | Yamanaka et al. | |
| 6,917,979 B1 * | 7/2005 | Dutra et al. .................. | 709/229 |
| 6,999,991 B1 | 2/2006 | Ikeda | |
| 7,010,537 B2 | 3/2006 | Eyal et al. | |
| 7,058,691 B1 | 6/2006 | Yu et al. | |
| 7,120,438 B2 | 10/2006 | Omar et al. | |
| 7,123,626 B1 | 10/2006 | Feyerabend | |
| 7,140,011 B2 | 11/2006 | Hallford | |
| 7,231,366 B1 | 6/2007 | Barry | |
| 2005/0033860 A1 | 2/2005 | Muhonen et al. | |
| 2005/0063329 A1 | 3/2005 | Lee et al. | |
| 2005/0163141 A1 * | 7/2005 | Katayama .................. | 370/412 |
| 2005/0172026 A1 | 8/2005 | Jeon et al. | |
| 2005/0193096 A1 | 9/2005 | Yu et al. | |
| 2005/0201320 A1 | 9/2005 | Kiss et al. | |
| 2006/0048042 A1 | 3/2006 | Sembower et al. | |
| 2006/0048053 A1 | 3/2006 | Sembower et al. | |
| 2006/0206610 A1 | 9/2006 | Ling et al. | |
| 2006/0235872 A1 | 10/2006 | Kline et al. | |
| 2006/0250642 A1 | 11/2006 | Trappe et al. | |
| 2006/0271662 A1 * | 11/2006 | Fritsch et al. .................. | 709/223 |
| 2007/0124422 A1 | 5/2007 | Hwang et al. | |
| 2007/0214245 A1 * | 9/2007 | Hamalainen et al. ......... | 709/223 |

FOREIGN PATENT DOCUMENTS

KR 10-0651435 11/2006

(Continued)

OTHER PUBLICATIONS

Podnar et al.; Mobile Push: Delivering Content to Mobile Users; Published 2002; Retrieved from http://ieeexplore.ieee.org/stamp/stamp.jsp?tp=&arnumber=1030826&isnumber=22138.*

(Continued)

*Primary Examiner* — Haresh N Patel
*Assistant Examiner* — Chau Le
(74) *Attorney, Agent, or Firm* — Scully, Scott, Murphy & Presser, P.C.; William Stock, Esq.

(57) ABSTRACT

A method, system and computer program product for pushing contents to client devices is disclosed. The method, system, and computer program product handles group pushes, manages different content priorities, prevents one content push from starving others, and handles different transport mechanisms for different clients.

18 Claims, 6 Drawing Sheets

FOREIGN PATENT DOCUMENTS

| KR | 10-0683813 | 2/2007 |
|---|---|---|
| WO | 2004/036827 A1 | 4/2004 |

OTHER PUBLICATIONS

Lin et al.; An Intelligent Push System for Mobile Clients with Wireless Information Appliances; Published Aug. 2004; Retrieved from http://ieeexplore.ieee.org/stamp/stamp.jsp?arnumber=01341706.*

Huang et al., Publish/subscribe in a mobile environment, Nov. 2004, 10 pages. Retrieved From http://portal.acm.org/citation.cfm?id=1035681.*

Cugola et al., Using publish/subscribe middleware for mobile systems, Oct. 2002, 9 Pages. Retrieve From http://portal.acm.org/citation.cfm?id=643552.*

Tosi, D., "An Advanced Architecture for Push Services", Proceedings of the Fourth International Conference on Web Information Systems Engineering Workshops (WISEW'03), Dec. 13, 2003.

Vujinovic, O., et al., "Multimedia Messaging Service in 3G networks", Mar. 2006.

http://docs.oracle.com/cd/A97329_03/core.902/a95926/wireless.htm, "Oracle9i Application Server Concepts; Release 2 (9.0.2); Part No. A95926-02", 2002.

"WebSphere MQ", Source: Internet Archive, Feb. 22, 2008.

www.icetechnology.com, "ICE iPush Communication Server V2 Datasheet", Production version 2.0-2.1, Document version 1.6, 2005.

Kassinen, O., et al., "Group-Based Content Push with Dynamic Session Startup", MUM '05 Proceedings of the 4th International conference on Mobile and ubiquitous multimedia, 2005.

Haberl, S., "Master's Thesis; An efficient and open implementation of the Minstrel broadcasting infrastructure", Distributed Systems Group 2000, http://www.infosys.tuwien.ac.at/, Technical University of Vienna, Dec. 2000.

"Ribes MMS Push Engine: Solutions for a new mobile world; platform for wireless pushing of Multimedia Messages", RIBES informatica, Source: Internet Archive (www.archive.org) Mar. 6, 2007.

* cited by examiner

CONTENT PUSH SERVICE

BACKGROUND OF THE INVENTION

1. Field of the Invention

The present invention generally relates to pushing contents, more particularly, to a method, system and computer program product for managing content push services in a client-server environment.

2. Description of the Prior Art

A common requirement of application service providers that serve mobile users is the ability to push a content to a client device. This ability is central to services such as road navigation, news updates, and severe-weather alerts. Current existing approaches use low-level network protocols, such as TCP sockets or HTTP, or are software-based. Use of network protocols can be effective but require high degree of involvement from the application service providers in handling slow networks, busy clients, and disconnection. The different protocols are required for the different networks used by different clients. Also, network solutions may not ensure in-order delivery of a series of contents from a single application service provider. Software-based solutions such as IBM's MQ Series product family manage some of these problems but, as a software solution, do not handle pushing multiple, independently-operating contents to clients at the same time.

When multiple application service providers push contents to a single client at the same time, it may overload the client. The application service providers may push the contents with different levels of priority. However, the application service providers cannot manage priority-based services, because the application service providers are independent and unaware of each other. A client cannot manage priority-based services, because by the time the client see the content, the content has already been delivered or is in the process of delivery. With current solutions, a client cannot interrupt receiving a large-file, low-priority, non-time-sensitive content in order to receive a high-priority, time-sensitive content because the client cannot know the high-priority content is waiting.

Existing software solutions that merely allow tagging contents with priority and dequeueing according to priority do not actually deliver the contents based on priority, nor do the existing software solutions ensure non-starvation of low-priority content. Neither a network nor the software solutions may manage the efficient use of the wireless network, instead giving each application service provider dedicated in-turn access to a wireless link.

FIG. 1 depicts a conventional low-bandwidth wireless networking environment, where each gadget communicates each other via the low-bandwidth wireless network. In a wireless communication society 100, computers such as 110 (1) and 110(n), a cellular phone 138, a laptop 136, a GPS navigation system in a vehicle, a PDA 132, and iPod 130 transmit and receive data through a wireless network 120. The wireless network 120 may be IEEE 802.11, Wi-Fi, Wireless LAN, CDMA, GSM, PCS, AMPS, etc.

A U.S. patent application (application Ser. No. 11/953, 515) "COMPOSITION-BASED APPLICATION USER INTERFACE FRAMEWORK", which includes same inventors, discloses a novel document-oriented model for delivery of telematics services to present interactive user interfaces on in-vehicle clients. The application further discloses an XVC (extensible Viewer Composition) model that has three primary characteristics: (1) the invention supports a document-based application model; (2) application user-interfaces are compound documents, each element addressing a different viewer; and (3) user interfaces of multiple applications are composed into a single glanceable user interface on the client for ease of use and expediency.

Having set forth the limitations of the prior art, it is clear that what is required is a method, system or computer program product capable of handling a group push (i.e., pushing contents to a group of clients), managing diverse priorities for contents, preventing one push (i.e., pushing a content) from starving other pushes, and handling different transport mechanism for different client devices.

SUMMARY OF THE INVENTION

It is therefore an object of the present invention to provide a method, system and computer program product for managing multiple services that pushes contents over a wireless network.

In one embodiment, there is provided a system for managing multiple services that pushes contents over a wireless network comprising:

a content receiver unit for receiving the contents from application service providers;

a series handler unit for ensuring each content is delivered in the order specified by the application service provider;

a group handler unit for allowing the application service provider to define a group, looking up members of the group, and pushing the contents to each member of the group;

a plurality of content senders for performing transport of data of the contents to client devices; and a content dispatcher unit for maintaining a list of the content senders, enqueuing the contents in the content senders, and activating content senders.

In another embodiment, there is provided a method for managing multiple services that pushes contents over a wireless network comprising:

receiving the contents from application service providers;

checking if the contents received in a series;

ensuring each content is received in the order specified by the application service provider;

keeping the contents until all contents in a series arrive;

checking if the contents are to be delivered to a group;

looking up members of the group;

pushing the contents to each member of the group; and performing actual transport of data of the contents to client devices.

According to one aspect of the present invention, if a content is bigger than a maximum unit size fixed by a system administrator, the content is divided into smaller pieces and pushed one piece at a time. Different transport mechanisms are supported for different client devices.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE PREFERRED EMBODIMENTS

Hereinafter, embodiments of the present invention will be described in detail with reference to the accompanying drawings.

Figure 1:
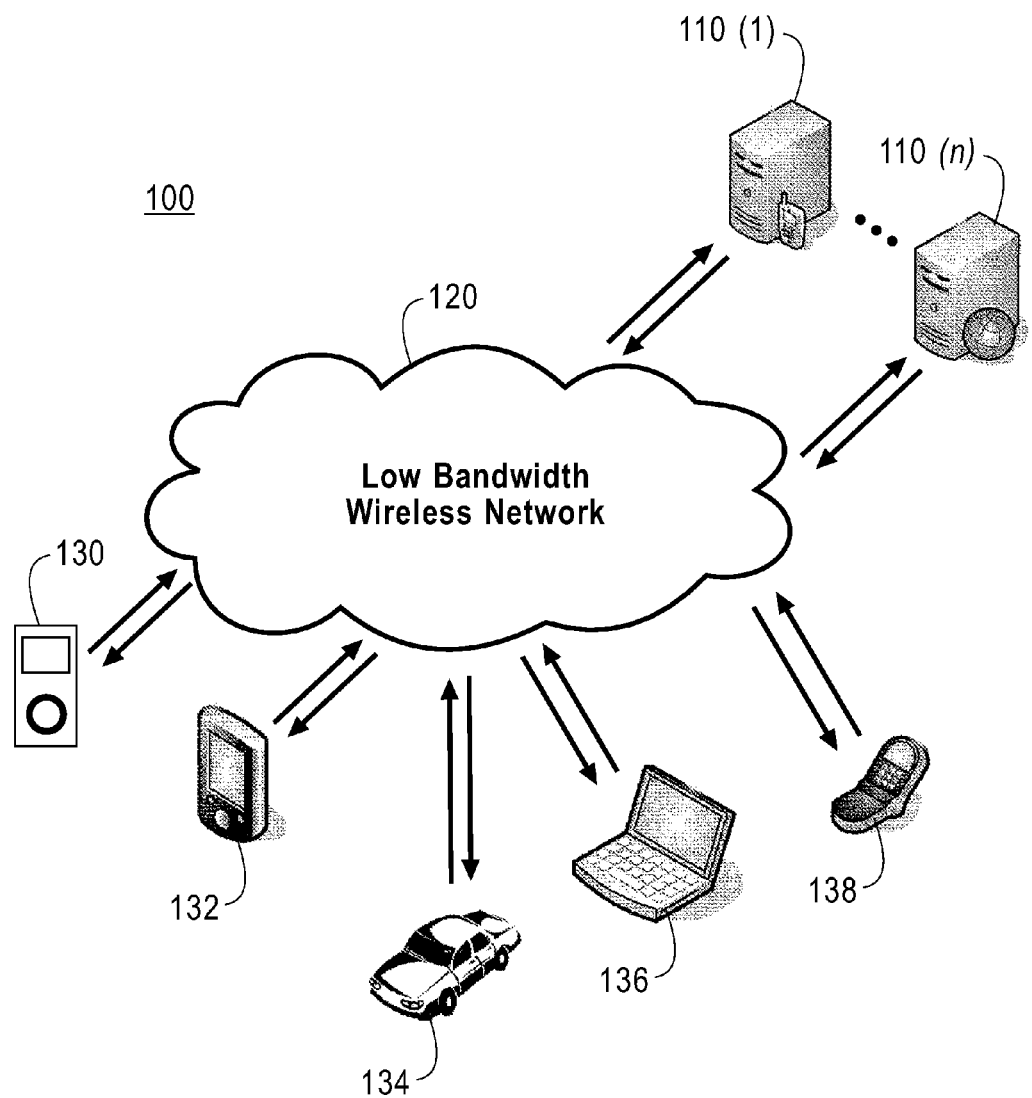
FIG. 1 illustrates a prior art invention that utilizes a low-bandwidth wireless network to communicate.
Figure 2:
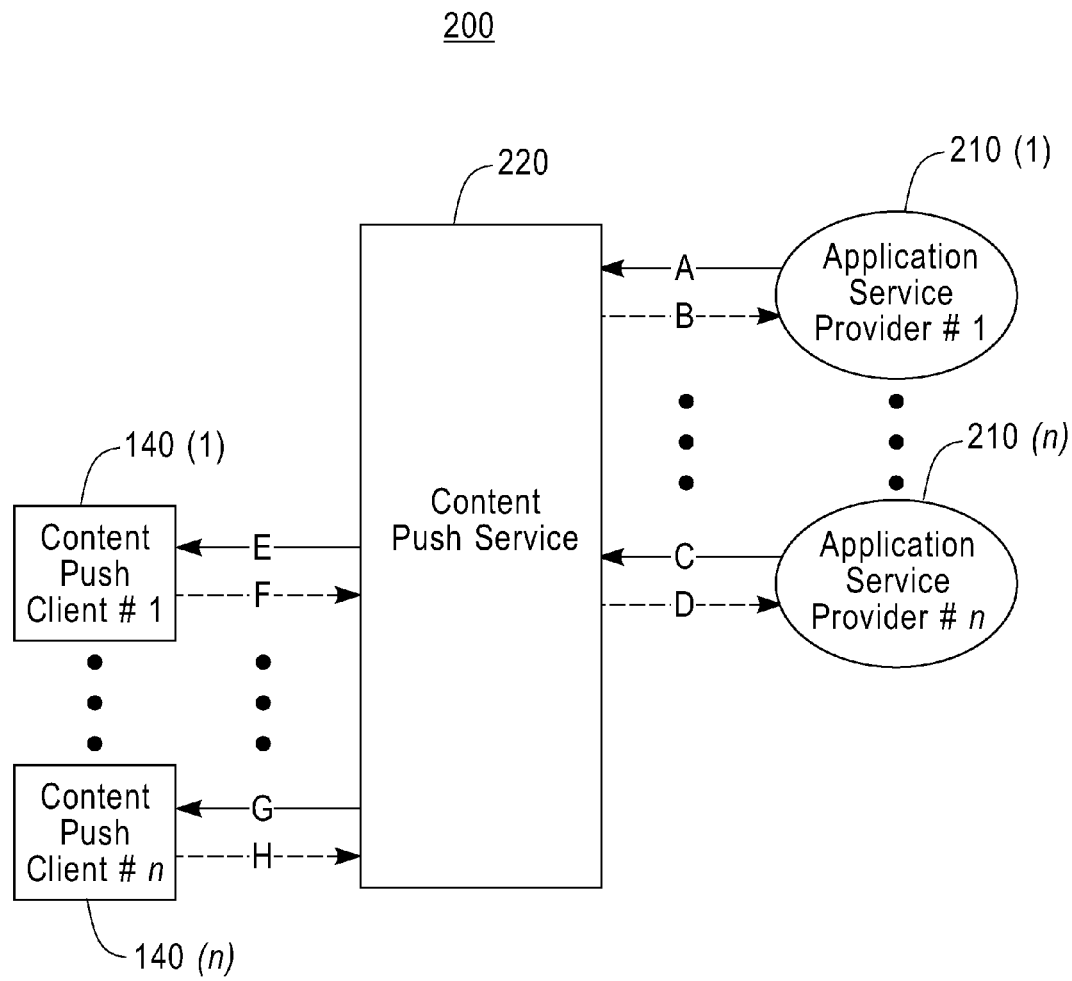
FIG. 2 illustrates an environment where the present invention can be applied.

FIG. 2 depicts an environment where the present invention can be applied. In a wireless network 200, there are a plurality of application service providers such as 210(1) and 220(n). An application service provider may be a vehicle navigation system that pushes driving instructions to drivers. Another application service provider may be a road-hazard alerting service that pushes alerts to drivers. The application service providers 210 push contents to a Content Push Service (CPS) 220. Arrows A and C indicates contents are delivered from application service providers 210 to the CPS 220. After receiving contents, the CPS 220 sends acknowledge receipts to the application service providers 210. Arrows B and D indicate these acknowledge receipts from the CPS 220 to the application service providers 210. Basically, the CPS 220 receives contents (e.g., ringtone, alert, wall-paper, text, graph, sound, etc.) from the application service providers 210 and forwards the contents to Content Push Clients 140. The CPS 220 handles a group push (i.e., pushing contents to a group of clients), manages diverse priorities for contents (i.e., high-priority contents and low-priority contents), prevents one push (i.e., pushing a content to a client) from starving other pushes, and handles different transport mechanism for different client devices (e.g, For PC users, the CPS 220 may uses TCP/IP. For cellular phone users, the CPS 220 may use a WAP (Wireless Application Protocol) Push). The Content Push Clients such as 140(1) and 140(n) receive contents from the CPS 220 and delivers the contents to receivers (i.e., client devices such as a GPS navigation system, a cellular phone, or a personal computer) indicated in content-push messages (e.g., WAP Push or alert). Arrows E and G indicate receiving contents from the CPS 220 to the Content Push Clients 140. Arrow F and H indicate acknowledge receipt sent from the Content Push Clients 140 to the CPS 220.

Figure 3:
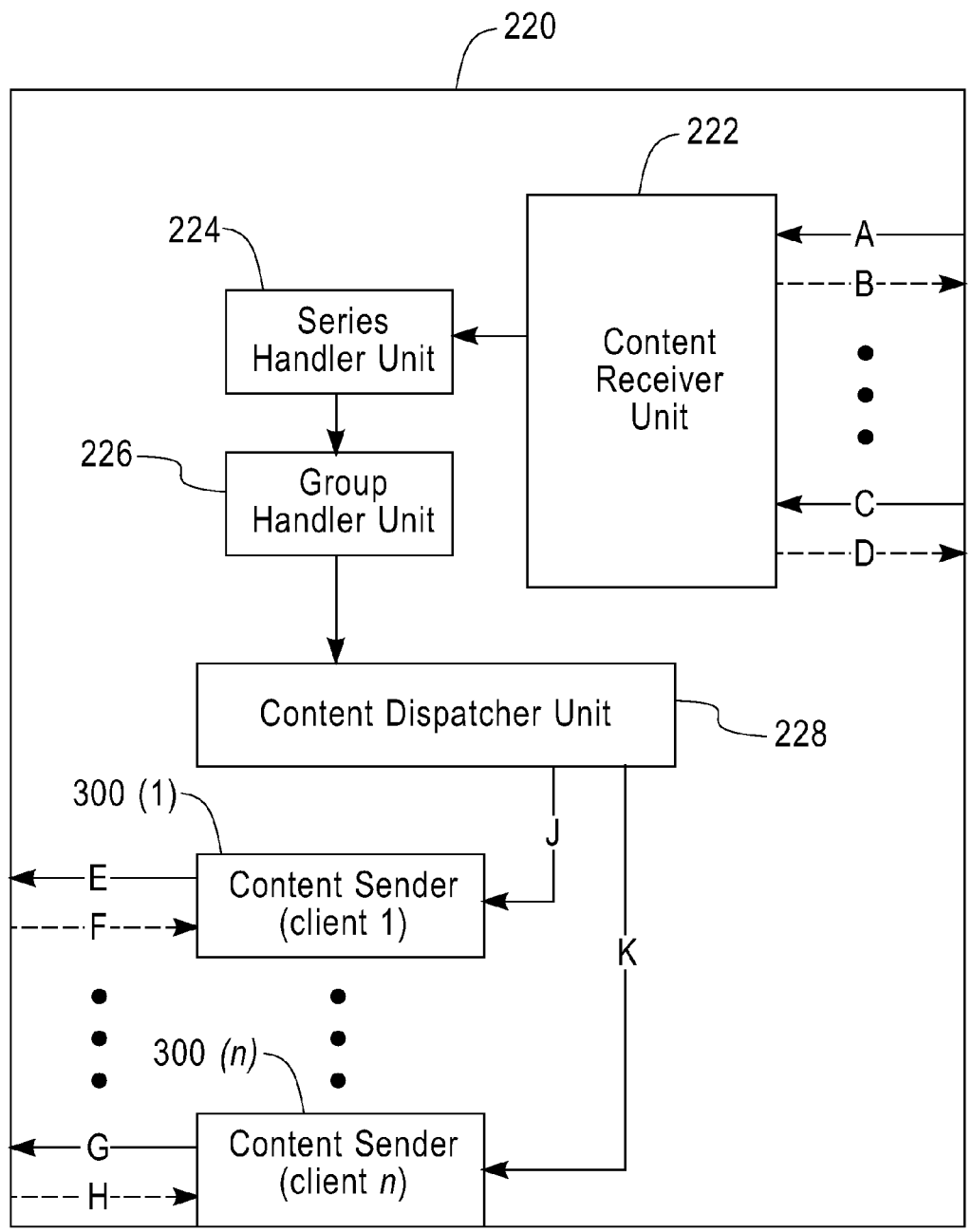
FIG. 3 illustrates one embodiment of the present invention.

FIG. 3 illustrates an embodiment of the CPS 220. The CPS 220 includes a Content Receiver Unit 222, a Series Handler Unit 224, a Group Handler Unit 226, a Content Dispatcher Unit 228, and a plurality of Content Senders such as 300(1) and 300(n). The Content Receiver Unit 222 receives contents from application service providers 210, sends acknowledge receipts to application service providers 210, and forwards the contents to a Series Handler Unit 224. If the contents are received in a series, the Series Handler Unit 224 ensures the contents received as part of a series are pushed in the order specified by the application service providers. In one embodiment, the CPS 220 allows an application service provider to send contents to a group of client devices. Then, the Group Handler Unit 226 is responsible for looking up members of a group and performing an individual push on each member (i.e., pushing a content to each client device in the group). The Content Sender 300 performs actual transport of data of contents to a client device. There is one Content Sender 300 for each active client device. The Content Dispatcher Unit 228 maintains a list of the Content Senders 300. If a Content Sender is currently pushing a content to a client, the Content Dispatcher Unit 228 enqueues the content in the Content Sender. If a Content Sender is not pushing a content, the Content Dispatcher Unit 228 enqueues the content in the Content Sender and activates the Content Sender to start pushing.

Figure 4:
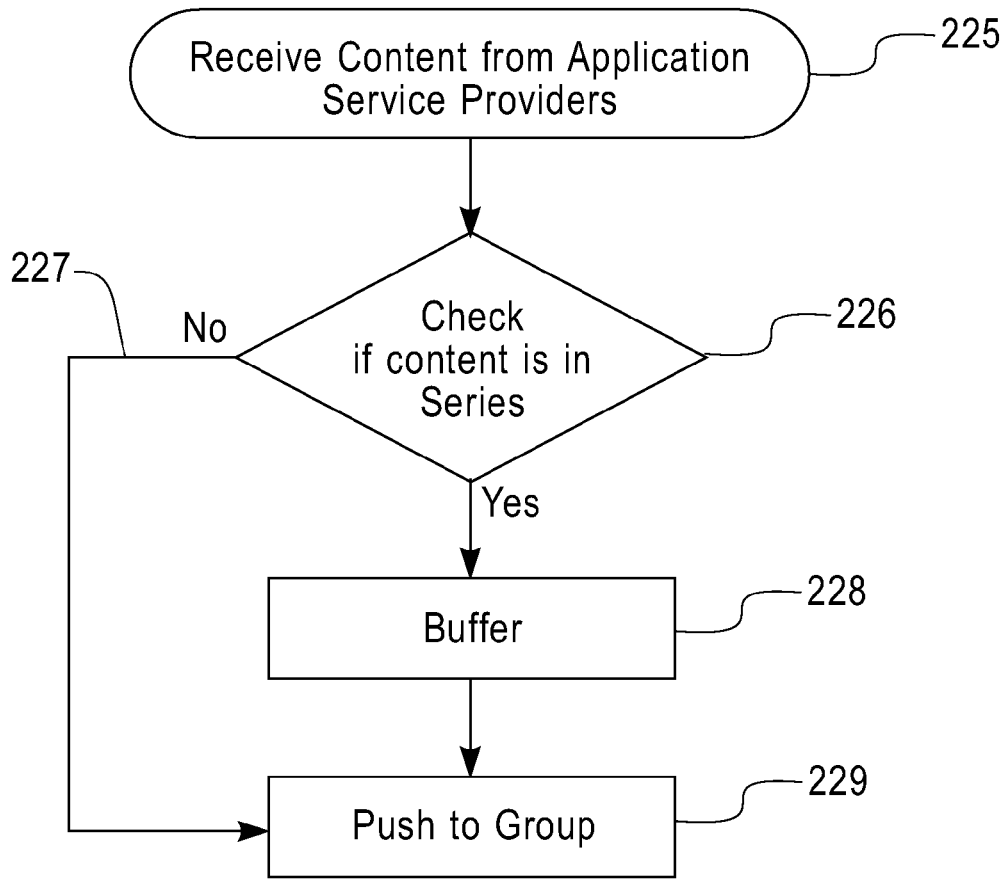
FIG. 4 illustrates a flow chart that a series handler unit utilizes.

FIG. 4 depicts a flow chart that the Series Handler Unit 224 utilizes. At step 225, the Series Handler Unit 224 receives contents from application service providers through the Content Receiver Unit 222. At Step 226, the Series Handler Unit checks if contents are in a series. If the contents are not serialized, at step 227, the contents are directly checked if the contents are delivered to a group. If the contents is are serialized, at step 228, a series buffer is provided to keep the contents until all contents in a series arrive. When pushing contents, the series buffer serializes the contents according to their sequence numbers in a series. At step 229, the pushed contents from the series buffer are forwarded to check if the contents are delivered to a group.

Figure 5:
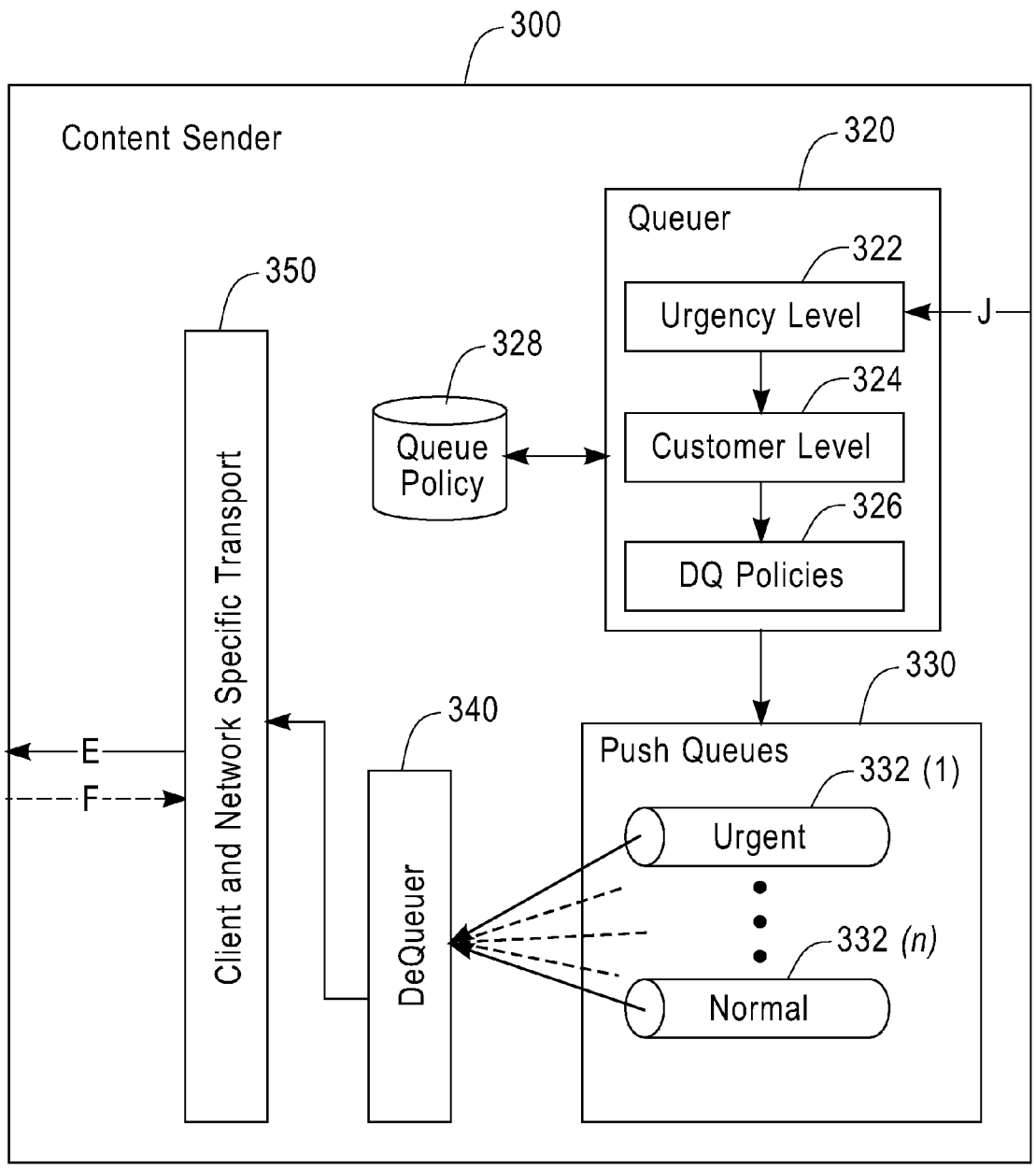
FIG. 5 illustrates a block diagram of a content sender.

FIG. 5 depicts an embodiment of the Content Sender 300. The Content Sender 300 includes Queuer 320, a Queue Policy 328, Push Queues 330, DeQueuer 340, and Client and Network Specific Transport 350. After receiving contents from the Content Dispatcher Unit 228, Queuer checks urgency level of contents at step 322 (e.g., An urgent content is delivered ahead of a normal content, if they are arrived at same time.), checks customer level at step 324 (e.g., a content pushed from a "gold" customer is delivered ahead of a content from a "silver" customer.), and checks dequeue policy at step 326 (e.g., If a content has been waiting for more than 3 seconds, the content should be ahead of any other contents, no matter what customer level.). The Content Sender employs Push Queues 330 that supports diverse priority levels. In one embodiment, the Push Queues 330 supports two different priority levels, an URGENT queue 332(1) and a NORMAL queue 332(n). DeQueuer 340 utilizes a scheduling algorithm that prevents starvation of a NORMAL queue 332(n), removes contents from top of queues, and forwards the contents to the Client and Network Specific Transport 350. The Push Queues 330 and DeQueuer 340 ensure that client devices receive contents one at a time. The Client and Network Specific Transport 350 applies different content delivery mechanisms for different clients. For example, to push contents to PC users, the Client and Network Specific Transport 350 may use TCP/IP. To push contents to cellular phone users, the Client and Network Specific Transport 350 may use carrier's own push services such as WAP (Wireless Application Protocol) Push. The Queue Policy 328 stores data related to policy (e.g., what is the level of a particular customer, how long a content may stay in a queue before it is dequeued.)

Figure 6:
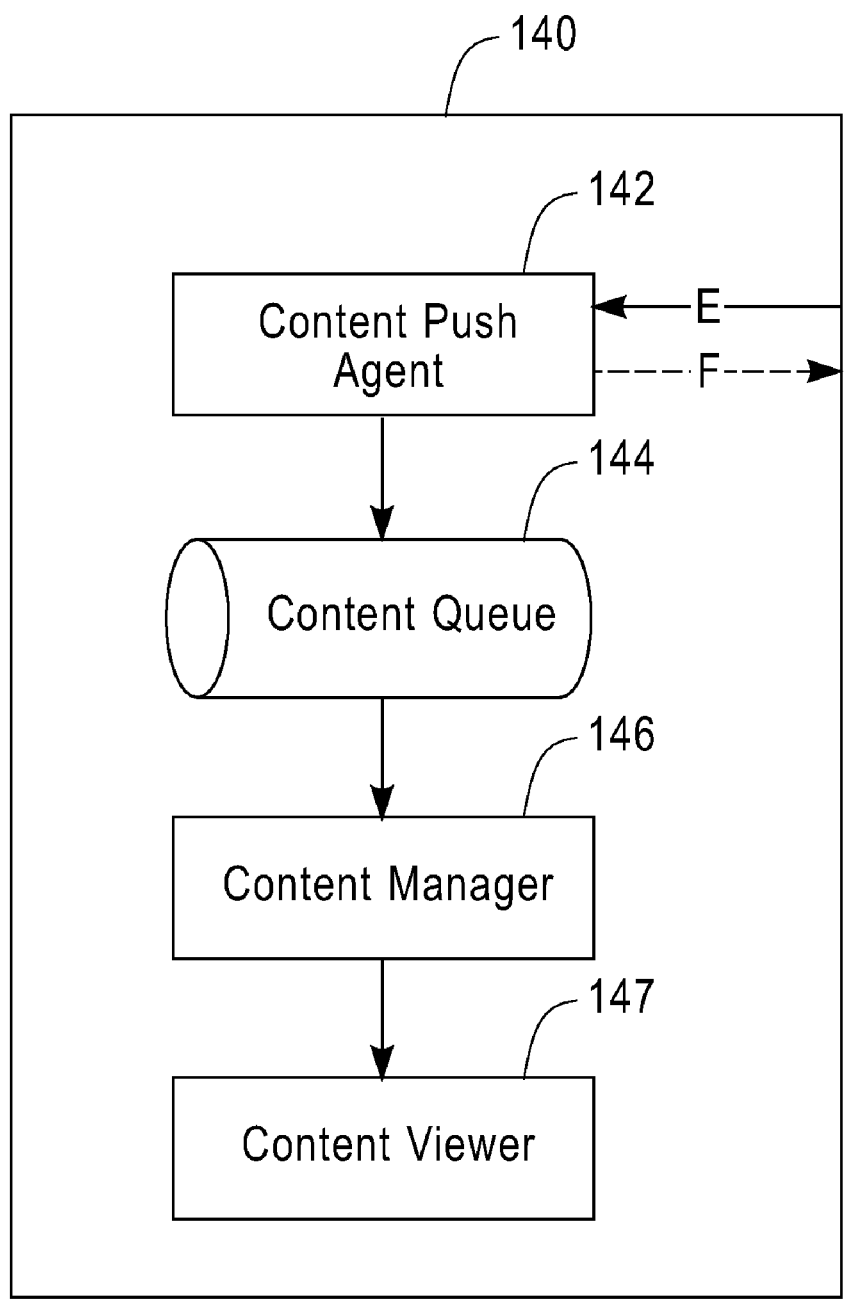
FIG. 6 illustrates a block diagram of a content push client.

FIG. 6 depicts an embodiment of the Content Push Client 140. The Content Push Client 140 includes a Content Push Agent 142, a Content Queue 144, a Content Manager 146, and a Content Viewer 147. The Content Push Agent 142 handles communication between the CPS 220 and the Content Push Client 140 by pulling contents from the Client and Network Specific Transport 350 and sending acknowledge receipt to the Client and Network Specific Transport 350. The Content Manager 146 receives the contents from the Content Push Agent 142, stores contents in the Content Queue 144 and forwards the contents to a Content Viewer 147, which is indicated in a content-push message (e.g., WAP Push or alert). The Content Viewer may be a Ticker Viewer, a HTML Viewer, a Map Viewer, etc.

The present invention guarantees reliable and asynchronous content push (i.e., pushing a content) to clients on diverse wireless networks by offering application services providers a single technology-independent interface. Applications are offered a "send and forget" service. "Send and forget" service means that after an application service provider delivers a content to the Content Push Service (CPS), the application service provider does not have to further manage delivering the content. The CPS will deal with all the details of getting the content to a client device. An application service provider is notified asynchronously, if a push (i.e., pushing a content) encounters a problem. This simplifies application programming because application service providers do not need to be concerned with delays in the sending (i.e., pushing a content) process.

In one embodiment, the present invention provides priority-based transmission, which means the highest-priority content is forced to wait the least. An application service provider chooses a priority level of a content. In a pay-per-use scheme (i.e., an application service provider pays a fee for each use of the service such as each push), the application service provider may expect to pay a higher price for choosing a higher priority. (As alternatives to the pay-per-use scheme, the application service provider may pay a fee monthly or annually.) Priority allows application service providers to indicate the time-sensitive nature of their contents.

A quality-of-service (QoS) parameter, set at an application registration time, acts to modify a priority level of a content. Application services providers would pay more for high-priority level service (e.g., "Gold" level service) than for low-priority level service (e.g., "Silver" level service). In one embodiment, a priority parameter has higher weight than the QoS parameter. However, an application service provider can change parameter setting to let QoS parameter has higher weight than a priority parameter.

In one embodiment, the present invention supports a group-push mechanism (i.e. pushing contents to a group of client devices), which allows application service providers to define groups and then push content to a group simply by naming the group. This is convenient for application service providers, because the application service providers do not need to specify each member of a group for each push.

In one embodiment, a content can be pushed according to a schedule of time or event. For example, when used with a group push, an application service provider can use pushes (i.e., pushing contents) for a system maintenance purpose during off-peak hours to take advantage of lower rates.

In one embodiment, contents from multiple application service providers are aggregated to make most effective use of low-bandwidth connection, which may be wireless or wired. Aggregating contents allows the Content Push Service to make more effective use of the communications channel for multiple pushes that have arrived within a few moments of each other.

In one embodiment, a content that is bigger than a maximum unit size fixed by a system administrator is split into several fragments. Therefore, if, a client device becomes disconnected, e.g., by entering a tunnel, in the middle of receiving a large-file content, the entire large-file content does not need to be resent. Because the client device keeps the fragments that were received before the disconnection, the client device starts to receive new fragments that have not been transmitted or the fragment that has been interrupted due to the disconnection. In addition, this mechanism (i.e., dividing a large-file content into smaller pieces) prevents a large, low-priority file content from blocking a small, high-priority content. In prior existing solutions, if a low-priority large-file content arrived first and was being transmitted, a small high-priority content could not be transmitted, until transmitting the low-priority large-file content was finished. However, the present invention allows a high-priority content to be interleaved. Therefore, a high-priority content that arrives after a large low-priority content has begun to send should not have to wait, until the entire large low-priority content is sent.

Although the preferred embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A system for managing multiple services that pushes contents over a wireless network to client devices comprising:

a computing system with a microprocessor and memory;

a content receiver unit, implemented by the computing system, for receiving the contents from multiple application service providers, the contents having an associated priority parameter and an associated QoS (Quality-of-Service) parameter, the associated priority parameter indicating priority levels associated with delivering the contents, the associated QoS parameter indicating a quality associated with the delivering the contents, and the priority parameter has greater weight in determining the priority levels associated with the deliveries of the contents than the QoS parameter;

the multiple application service providers specifying a group of the client devices and specifying an order in which the contents are delivered to the group, and prior to the delivering the contents to the group, modifying the priority levels associated with the delivering the contents by adjusting the associated priority parameter;

a group handler unit, implemented by the computing system, for identifying members of the group of the client devices;

a series handler unit, implemented by the computing system, for ensuring that the contents are delivered to each identified member of the group in the order specified by the multiple application service providers;

a content dispatcher unit, implemented by the computing system, for determining content senders, enqueuing the contents at the content senders according to the modified priority levels, and activating the content senders to deliver the contents, according to the modified priority levels, to each identified member of the group in the specified order; and the content senders, implemented by the computing system, for aggregating the enqueued contents for the delivery according to the modified priority levels in the specified order and performing the delivery of data of the aggregated contents, according to the modified priority levels, to each identified member of the group over a wireless communication channel.

2. The system according to claim 1, wherein the content sender comprising:

a queuer unit, implemented by the computing system, for checking the modified priority levels associated with the delivering the contents, customer level of the client devices and dequeue policy of the contents;

a plurality of queues for supporting diverse priority levels;

a dequeuer unit, implemented by the computing system, for managing the queues based on a scheduling algorithm that prevents starvation of low-priority queues; and a network transport unit, implemented by the computing system, for handling different transport mechanisms for different client devices.

3. The system according to claim 2, wherein the content sender further comprising:

a queue policy unit, implemented by the computing system, for storing data related to policy, said data comprising one or more of: what is the level of a particular customer and how long a content can stay in a queue before it is dequeued.

4. The system according to claim 2 further comprising:

a content push agent, implemented by the computing system, for pulling the contents from the network transport unit and sending acknowledge receipt to the network transport unit;

a content manager, implemented by the computing system, for receiving the contents from the content push agent and storing received contents in a queue; and a content viewers, implemented by the computing system, for receiving the contents from the content manager and providing the contents to users.

5. The system according to according to claim 2, wherein the plurality of queues have two priority levels.

6. The system according to claim 2, wherein if a content is bigger than a maximum unit size fixed by a system administrator, the content is divided into smaller pieces and sent one piece at a time.

7. The system according to claim 1, wherein a content sender represents a client device.

8. The system according to claim 1, wherein the contents are pushed to client devices according to a schedule of time or event.

9. The system according to claim 1, wherein the contents are delivered from the multiple application service providers to the content receiver unit through messages.

10. The system according to claim 1, further comprising:

a series buffer unit for keeping contents until all contents in a series arrives.

11. The method for managing multiple services that pushes contents over a wireless network to client devices comprising:

receiving the contents from multiple application service providers, the contents having an associated priority parameter and an associated QoS (Quality-of-Service) parameter, the associated priority parameter indicating priority levels associated with delivering the contents, the associated QoS parameter indicating a quality associated with the delivering the contents, and the priority parameter has greater weight in determining the priority levels associated with the deliveries of the contents than the QoS parameter;

specifying a group of the client devices;

specifying an order in which the contents are delivered to the group;

prior to the delivering the contents to the group, modifying the priority levels associated with the delivering the contents by adjusting the associated priority parameter;

identifying members of the group of the client device;

ensuring the contents are delivered to each identified member of the group in the order specified by the multiple application service providers;

maintaining a list of content senders;

enqueuing the contents at the content senders according to the modified priority levels;

activating the content senders to deliver, according to the modified priority levels, the contents to each identified member of the group in the specified order;

aggregating, at the activated content senders, the enqueued contents for the delivery according to the modified priority levels in the specified order; and performing, at the activated content senders, the delivery of data of the aggregated contents, according to the modified priority levels, to each identified member of the group over a wireless communication channel.

12. The method according to claim 11, further comprising:

allowing the multiple application service providers to define a group; and maintaining a list of the client devices.

13. The method according to claim 11, further comprising:

checking the modified priority levels associated with the delivering the contents, customer level of the client devices and dequeue policy of the contents;

providing a plurality of queues that support diverse priority levels associated the deliveries of the contents; and providing a scheduling algorithm that prevents starvation of low-priority queues.

14. The method according to claim 11, wherein the step of performing transport of data of the contents to client devices is performed based on different transport mechanisms for different client devices.

15. The method according to claim 11, further comprising: pushing the contents to the each member of the group according to a schedule of time or event.

16. The method according to claim 11, wherein if a content is bigger than a maximum unit size fixed by a system administrator, the content is divided into smaller pieces and pushed one piece at a time.

17. A computer program product comprising computer storage device having computer readable program code means embodied therein for enabling a computer to push contents to client devices, the computer program code means in said computer program product comprising computer readable program code means for causing a computer to effect functions of:
  receiving the contents from multiple application service providers, the contents having an associated priority parameter and an associated QoS (Quality-of-Service) parameter, the associated priority parameter indicating priority levels associated with delivering the contents, the associated QoS parameter indicating a quality associated with the delivering the contents, and the priority parameter has greater weight in determining the priority levels associated with the deliveries of the contents than the QoS parameter;
  specifying a group of the client devices;
  specifying an order in which the contents are delivered to the group;
  prior to the delivering the contents to the group, modifying the priority levels associated with the delivering the contents by adjusting the associated priority parameter;
  identifying members of the group of the client device;
  ensuring the contents are delivered to each identified member of the group in the order specified by the multiple application service providers;
  maintaining a list of content senders;
  enqueuing the contents at the content senders according to the modified priority levels;
  activating the content senders to deliver, according to the modified priority levels, the contents to each identified member of the group in the specified order;
  aggregating, at the activated content senders, the enqueued contents for the delivery according to the modified priority levels in the specified order; and
  performing, at the activated content senders, the delivery of data of the aggregated contents, according to the modified priority levels, to each identified member of the group over a wireless communication channel.

18. The computer program product according to claim 17, wherein the method further comprises:
  checking the modified priority levels associated with the delivering the contents, customer level of the group of the client devices and dequeue policy of the contents;
  providing a plurality of queues to enqueue the contents according to the modified priority levels;
  providing a scheduling algorithm that prevents starvation of low-priority queues; and
  wherein if data of the aggregated contents is bigger than a maximum unit size fixed by a system administrator, the data of the aggregated contents is divided into small pieces and transported to the group of the client devices.

* * * * *